(12) United States Patent
Schofield et al.

(10) Patent No.: US 6,295,909 B1
(45) Date of Patent: Oct. 2, 2001

(54) SHEARING METAL STRIP

(75) Inventors: Simon Schofield; John Berry; Brian Cooper, all of Sheffield (GB)

(73) Assignee: Kvaerner Technology & Research Limited, Sheffield (GB)

( * ) Notice: Subject to any disclaimer, the term of this patent is extended or adjusted under 35 U.S.C. 154(b) by 0 days.

(21) Appl. No.: 09/462,255

(22) PCT Filed: Jul. 7, 1998

(86) PCT No.: PCT/GB98/01933

§ 371 Date: Mar. 8, 2000

§ 102(e) Date: Mar. 8, 2000

(87) PCT Pub. No.: WO99/02296

PCT Pub. Date: Jan. 21, 1999

(30) Foreign Application Priority Data

Jul. 10, 1997 (GB) .................................................. 9714424

(51) Int. Cl.[7] ........................................................ B26D 1/62
(52) U.S. Cl. .............................. 83/285; 83/295; 83/296; 83/299; 83/304; 83/344; 83/563; 83/698.61
(58) Field of Search .......................... 83/37, 38, 698.41, 83/698.51, 698.61, 285, 296, 295, 299, 304, 305, 338, 343, 344, 345, 563, 640

(56) References Cited

U.S. PATENT DOCUMENTS

| | | |
|---|---|---|
| 2,245,442 * | 6/1941 | Morgan ................................... 83/38 |
| 2,274,452 * | 2/1942 | MacFarren ........................... 83/38 X |
| 3,057,239 | 10/1962 | Teplitz ..................................... 83/337 |
| 3,628,410 * | 12/1971 | Shields ............................... 83/296 X |
| 4,065,992 | 1/1978 | Peters et al. ............................. 83/285 |
| 4,103,577 | 8/1978 | Jackson et al. ......................... 83/337 |
| 4,141,266 * | 2/1979 | Hara et al. ............................ 83/37 X |
| 4,485,710 * | 12/1984 | Schlisio et al. ............... 83/698.61 X |
| 4,497,229 * | 2/1985 | Carrington et al. ............... 83/295 X |
| 4,656,905 * | 4/1987 | Ginzburg et al. .................. 83/305 X |
| 4,685,318 | 8/1987 | Ueda et al. ............................. 72/185 |
| 4,984,491 * | 1/1991 | Bragaglia ..................... 83/698.61 X |
| 5,464,166 * | 11/1995 | Kirkpatrick, III et al. ........ 83/305 X |
| 5,904,086 * | 5/1999 | Figge et al. ....................... 83/698.61 |
| 5,950,516 * | 9/1999 | Stab .................................. 83/698.51 |

FOREIGN PATENT DOCUMENTS 1 218 794    10/1968 (DE) .
0 771 603 A1    5/1997 (EP) .

* cited by examiner

Primary Examiner—Rinaldi I. Rada
Assistant Examiner—Charles Goodman
(74) Attorney, Agent, or Firm—Oliff & Berridge, PLC

(57) ABSTRACT

The invention is an apparatus for cutting metal sheet having two rotatable drums, wherein the metal sheet passes between the drums for cutting. Each of the drums has a cutting blade moved into and out of cutting position by an axial actuator rod. The cutting blade includes two sets of rollers bearing against one of a pair of profiled side surfaces of the axial actuator rod.

5 Claims, 6 Drawing Sheets

SHEARING METAL STRIP

BACKGROUND OF THE INVENTION

1. Field of the Invention

The invention relates to a method of shearing metal strip and apparatus therefor. In particular the invention relates to the shearing of continuous strip, at the end of its production, into finite lengths which are coiled onto a spool.

2. Description of Related Art

In many strip production facilities the shearing has to take place whilst the strip is moving at high speed, and modern strip production requires the strip to be moving at higher and higher speeds to ever greater efficiencies in production costs. Typically in known systems, a rotary shear is used to cut metal strip which is moving. Such a conventional rotary shear is shown consists of two rotating drums each of which has a cutting blade. The two drums rotate in opposite directions, and are usually geared together. Separate guide means are usually provided to guide the strip onto a coil at the end of a rolling mill line and to transfer the strip to a second coil when a first coil is complete, whilst at the same time permitting the continuous production of the strip at an uninterrupted rate.

The strip passes between the two drums. When the strip is to be cut, the two drums are accelerated from rest until the peripheral speed of the blades is equal to the strip speed. The peripheral speed of the blades needs to be closely matched to the speed of the snip, otherwise the shear will cause a tension snatch in the strip which could damage the strip, the shear or other equipment in the line. After the blades have cut the strip, the drums are then decelerated back to rest.

With such a conventional rotary shear, since the drums cannot be allowed to rotate through the cutting position more than once, the maximum speed at which the strip can be cut is limited by the power required to accelerate and decelerate the drums within less than one revolution. To accelerate the drums to a higher speed requires more power, which in turn requires a bigger drive motor, which in turn increases the total inertia of the system and thus demands even more power.

It is possible for rotary shears of this type to have more than one set of blades. In these cases the problem of accelerating and decelerating the drums is even more pronounced because a smaller fraction of a revolution,is available for acceleration and deceleration.

Mannesmann AG, EP 0 771 603 A1 shows a drum with a moveable cutter blade. FIG. 1 shows a simple wedge-type actuator for position control, using hydraulic control. FIGS. 4 and 5 show a multi-step actuator, requiring less actuator movement and giving semi-stable full-in and full-out cutter positions. US Steel, U.S. Pat. No. 3,057,239 shows a cutter with a cylinder 2 having a fixed blade 30 and cylinder 4 a retractable blade 58, which is controlled (FIG. 3) by an axially movable element 46 having pins 52 which enrage in sloping slots 62 in the blade 58.

SUMMARY OF THE INVENTION

The object of the present invention is to provide an improved cutter arrangement.

According to one aspect, the present invention provides metal strip cutting apparatus comprising two rotatable drums having respective cutting blades and arranged side-by-side so that the metal strip may pass between them, one of the blades being movable, under the control of an axial actuator rod in the drum, between a retracted position in which the strip passes freely between the drums as the drums rotate and an extended position in which the blades cut the strip, characterized in that the actuator rod is coupled to the blade by rollers.

The invention thus provides an arrangement whereby low-friction engagement is provided between the actuator rod and the blade. Preferably the rollers are in pairs on opposite sides of the actuator rod, giving a positive positioning of the blade. This, together with suitable profiling of the sides of the actuator rod, allows the blades to be given smooth acceleration and deceleration, reducing the size of the operating forces required. Preferably also unidirectional movement of the actuator produces extension then retraction of the blade. This has the advantage that the extended position of the blades can be arranged to be on a flat or nearly flat position of the actuator, so that the position of the blade is determined independent of any slight axial error in the positioning of the actuator.

According to another aspect the present invention provides a method of cutting metal strip using the apparatus just defined, characterized in that the drums are rotated at a speed matching the speed of the metal strip and, at the desired time, the movable blade is extended in less than one revolution of the drums, cuts the strip, and is retracted in less than the next revolution of the drums.

BRIEF DESCRIPTION OF THE DRAWINGS

Exemplary embodiments of the apparatus and method of the invention comprising two drums each with a single retractable blade will now be described with the aid of the appended drawings, in which.

DETAILED DESCRIPTION OF THE INVENTION

Figure 1:
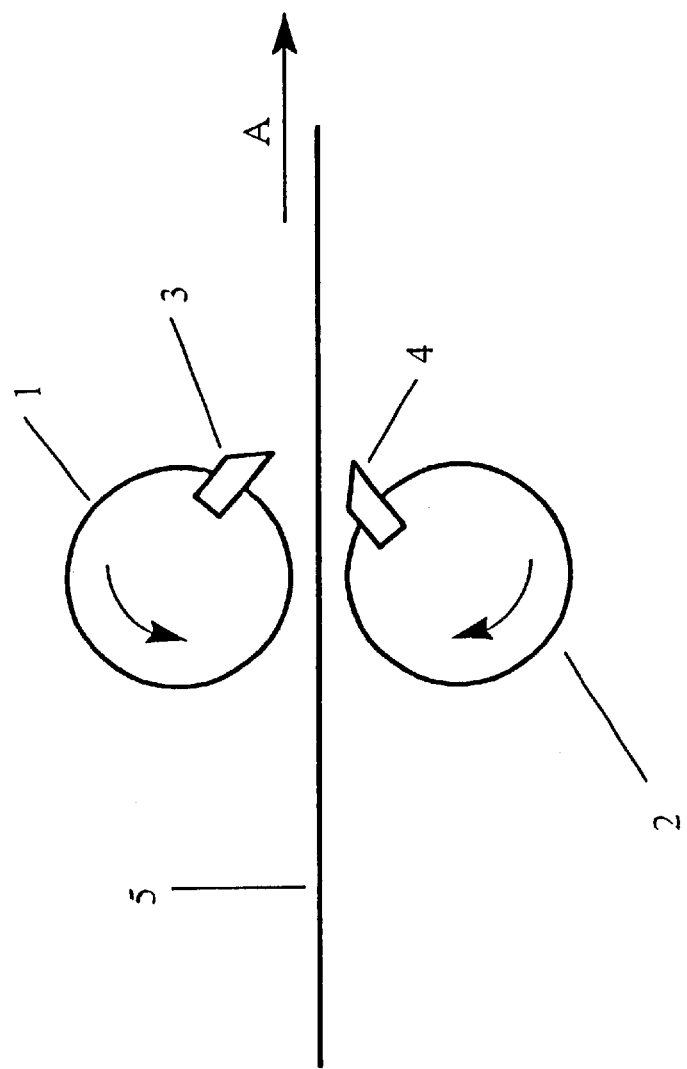
FIG. 1 is a schematic side view of a conventional rotatable shear means.

FIG. 1 shows a conventional rotary shear. The shear consists of two rotating drums 1 and 2 with respective cutting blades 3 and 4. The two drums rotate in opposite directions, as indicated by the arrows, and are usually geared together. Separate guide means are usually provided to guide the strip onto a coil at the end of a rolling mill line and to transfer the strip to a second coil when a first coil is complete, whilst at the same time permitting the continuous production of the strip at an uninterrupted rate.

The strip 5 passes between the two drums as shown. When the strip is to be cut, the two drums are accelerated from rest until the peripheral speed of the blades is equal to the strip speed. The peripheral speed of the blades needs to be closely matched to the speed of the strip, otherwise the shear will cause a tension snatch in the strip which could damage the strip, the shear or other equipment in the line. After the blades have cut the strip the drums are then decelerated back to rest.

Figure 2:
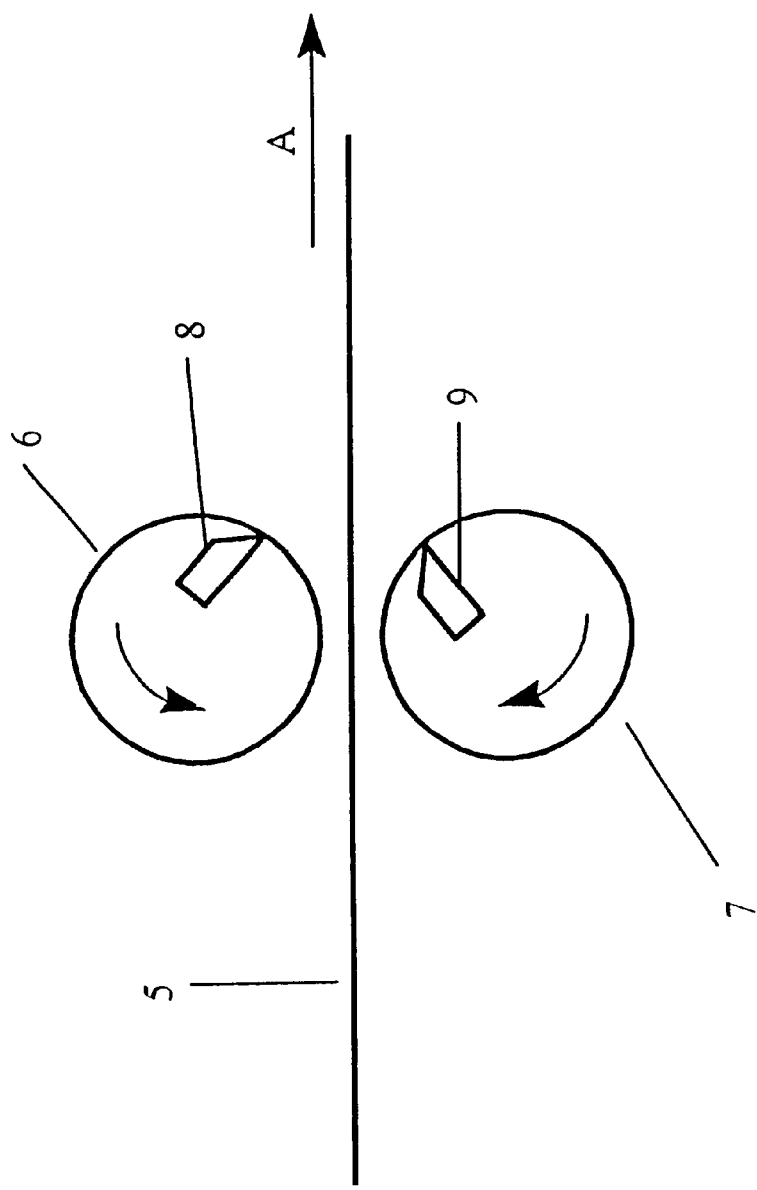
FIG. 2 is a schematic side view of a rotatable shear of a first form of the present apparatus.
Figure 3:
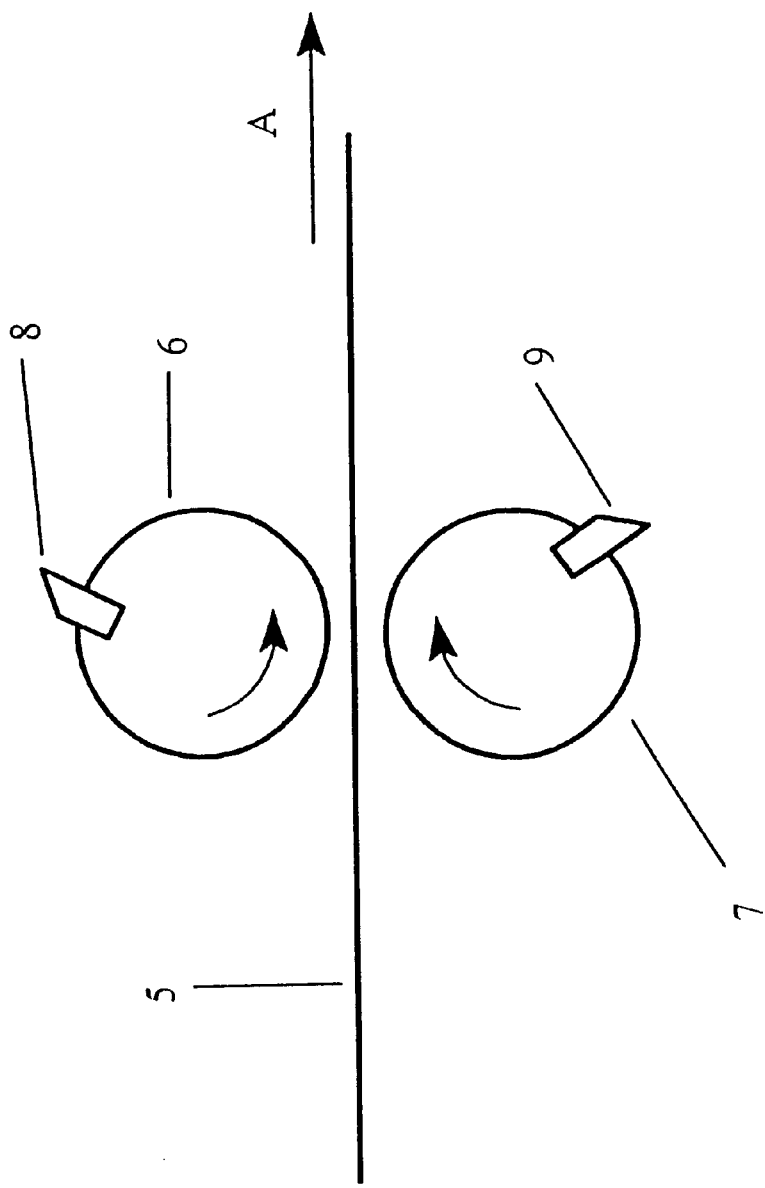
FIG. 3 is a schematic side view of a rotatable shear of the FIG. 2 apparatus in an alternative position.
Figure 4:
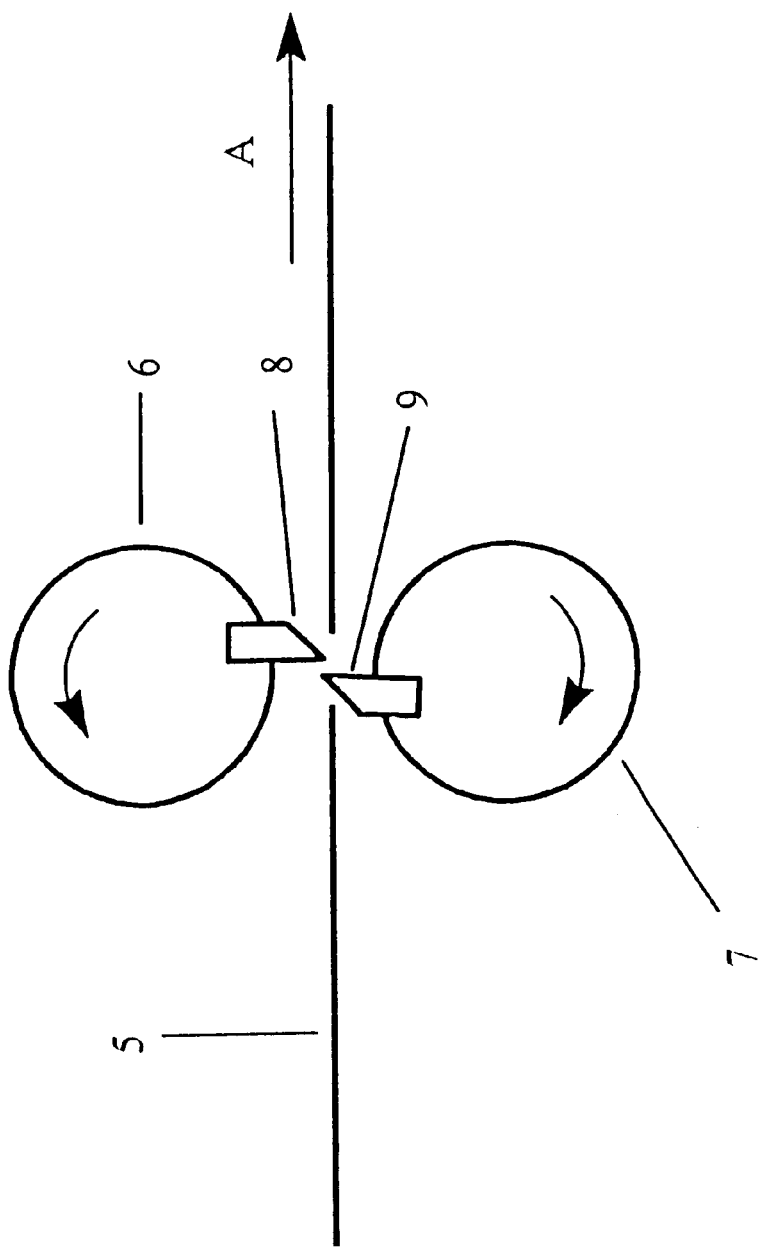
FIG. 4 is a schematic side view of a rotatable shear of the FIG. 2 apparatus, immediately after the cutting position.

FIGS. 2, 3, and 4 are schematic views of a side elevation of the present apparatus. The strip is travelling in the direction of arrow A. The two drums 6 and 7 contain respective blades 8 and 9 which can be retracted into the drum, which is the position shown in FIG. 2, or which can be extended to a position in which they would cut the strip as shown in FIGS. 3 and 4. With the blades in the retracted position, the drums are able to rotate fully without the blades coming into contact with the strip.

With this apparatus, it is not necessary to accelerate the drums to match the strip speed within the space of less than one revolution: the acceleration of the drums up to strip speed can occupy more than one full revolution, typically two or more revolutions. Alternatively the drums could rotate continuously at strip speed.

The blades 8 and 9 have respective cutting edges, which may have different longitudinal profiles.

When a cut is required, the blades 8 and 9 are moved to the extended position as shown in FIG. 3, and the drums continue rotating until the cut is made as shown in FIG. 4, after which the blades are retracted again back to the position shown in FIG. 2.

Figure 5:
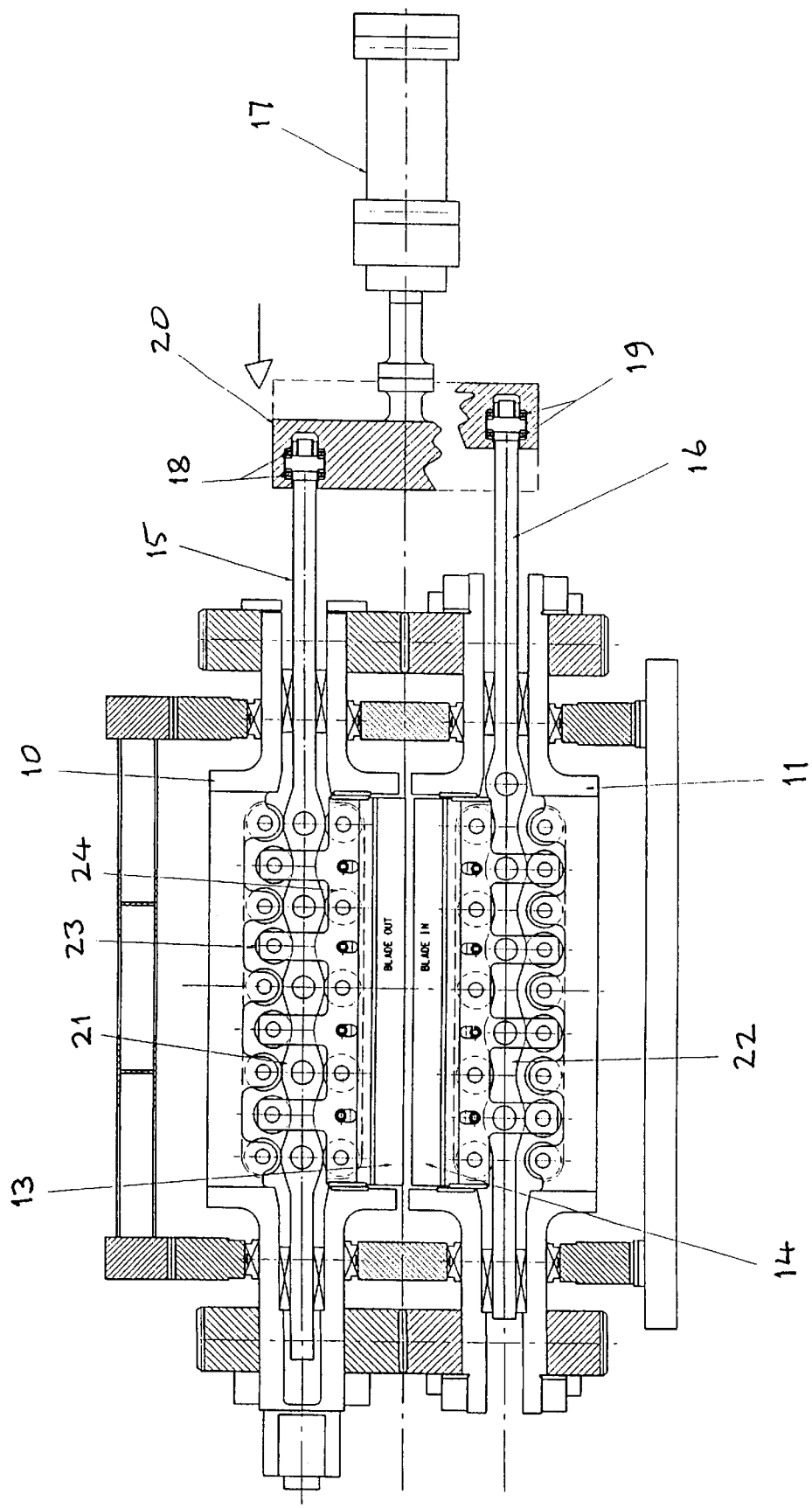
FIG. 5 is a more detailed cross section of the rotating shear of a second form of the present apparatus through the axis of the drum.
Figure 6:
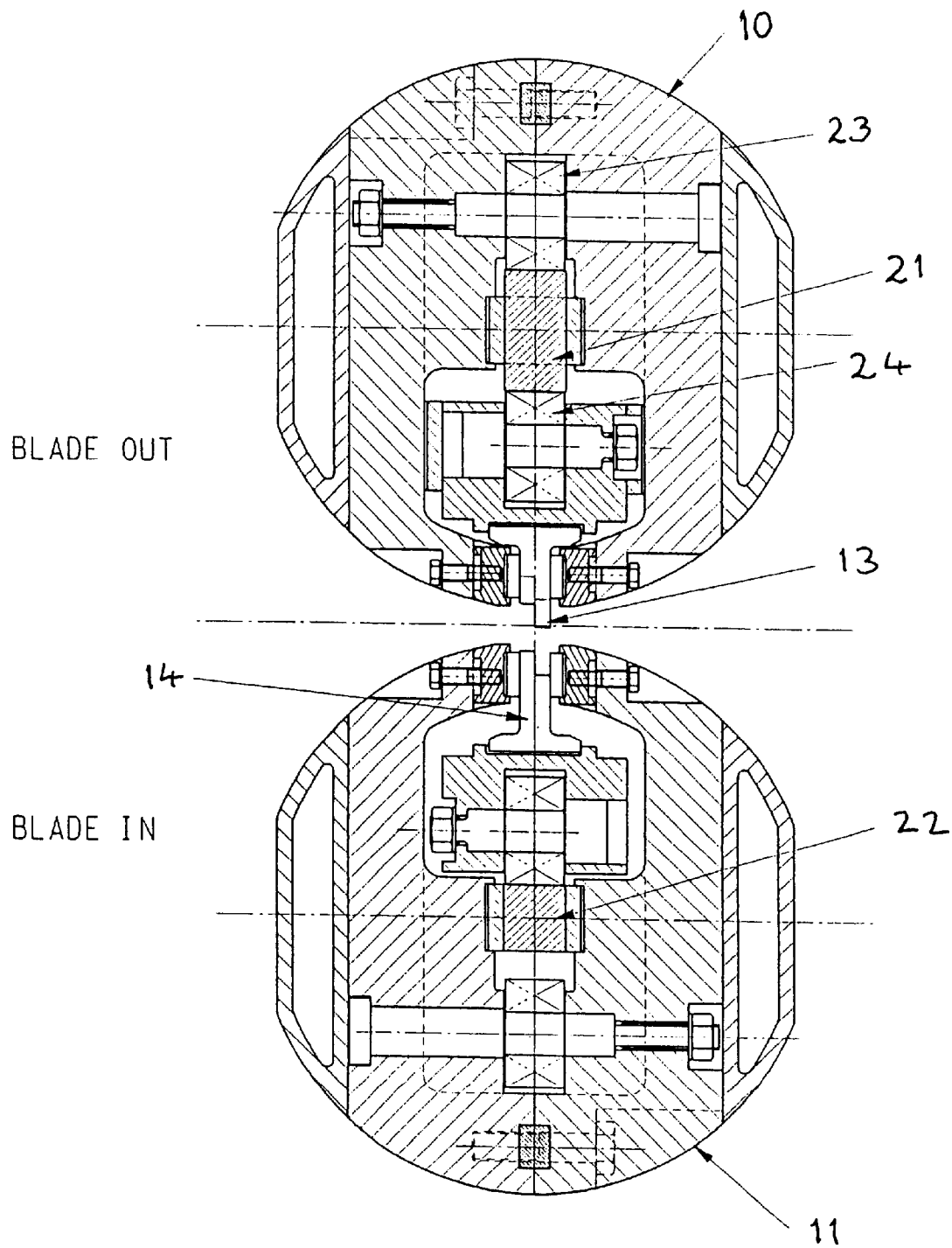
FIG. 6 is a transverse section of the drums in FIG. 5.

In the more detailed form of the present apparatus shown in FIGS. 5 and 6, the blades 13 and 14 are retracted and extended by a rod which runs down the center of each drum. FIG. 5 is cross-section of the apparatus showing the two drums 10 and 11 each with a retractable blade 13 and 14. For illustration purposes, the blade 14 is shown in the retracted position whilst blade 13 is shown in the extended position, though in practice the movement of the two blades is synchronized by the cross piece 20 so that both blades are extended or retracted together. It will be readily apparent that axial movement of the rods 15 and 16 causes the profiled sections 21 and 22 of these rods to move axially and since the blade assemblies are prevented from moving axially, the rollers 23 and 24 follow the profiles 21 and 22 and hence move the blades in or out radially.

The rods 15 and 16 are shown as being moved by a hydraulic cylinder 17. Thrust bearings 18 and 19 are used so that the rods can rotate with the drums but the cylinder and cross piece can remain stationary with respect to the rotation of the rod.

A transverse section of the drums 10 and 11, the blades 13 and 14, the profiled sections 21 and 22 of the actuating rods 15 and 16 and the rollers 23 and 24 is illustrated in FIG. 6. The upper drum 10 is shown with the blade out and the larger diameter sections of the rod 15 engage the rollers 24, forcing the blade means 13 outwards from the drum 10. The lower drum 11 is shown with the smaller diameter sections of the rod 16 engaging the rollers 24, while the larger diameter sections of the rod act on the rollers 23 and force the blade means back into the drum 11.

Stops (not shown) are preferably provided on the drums to limit the movement of the cutting blade means.

Preferably, a balance weight is provided at the opposite side to the cutting blade means.

It will be appreciated that by means of the present apparatus, a considerable increase in the speed of operation of the shear can be achieved as well as a considerable reduction in the power required to accelerate and decelerate the drums.

It will also be appreciated that the invention is not limited to the exemplary embodiment described above, but is intended to included any other embodiment within the concept of the invention as defined in the appended claims.

What is claimed is:

1. A metal strip cutting apparatus for use with a metal strip, comprising:

two rotatable drums each having a cutting blade and an axial actuator rod, the two rotatable drums being arranged side-by-side so that said metal strip passes between said two rotatable drums;

each axial actuator rod having a pair of profiled side surfaces and being disposed within the corresponding rotatable drum;

each cutting blade including two sets of rollers, each set of rollers bearing against one of said pair of profiled side surfaces of said axial actuator rod, said pair of profiled side surfaces disposed between said two sets of rollers; and wherein each axial actuator rod is adapted to move each cutting blade between a retracted position in which said metal strip passes freely between said rotatable drums and an extended position in which said cutting blades cut said metal strip.

2. The apparatus according to claim 1, wherein unidirectional axial movement of said axial actuator rod between two positions causes extension and retraction of said cutting blade.

3. The apparatus according to claim 1, wherein each rotatable drum includes a third set of rollers, said third set of rollers bearing against one of said profiled side surfaces of said axial actuator rod when said cutting blade is extended.

4. The apparatus according to claim 1, wherein said axial actuator rod is driven by a hydraulic cylinder.

5. The apparatus according to claim 1, wherein each said cutting blade is retractable.

* * * * *